US011412768B2

(12) United States Patent
Khatib et al.

(10) Patent No.: US 11,412,768 B2
(45) Date of Patent: Aug. 16, 2022

(54) METHOD OF IMPROVING TOLERANCE TO HYPOALLERGENIC INFANT FORMULAS

(71) Applicant: Mead Johnson Nutrition Company, Evansville, IN (US)

(72) Inventors: Khaled A Khatib, Omaha, NE (US); Win-Chin Chiang, Newburgh, IN (US); Jane Ehninger, Evansville, IN (US)

(73) Assignee: Mead Johnson Nutrition Company, Evansville, IN (US)

( * ) Notice: Subject to any disclaimer, the term of this patent is extended or adjusted under 35 U.S.C. 154(b) by 0 days.

(21) Appl. No.: 14/844,143

(22) Filed: Sep. 3, 2015

(65) Prior Publication Data
US 2016/0255869 A1    Sep. 8, 2016

Related U.S. Application Data

(63) Continuation of application No. 12/254,033, filed on Oct. 20, 2008, now abandoned.

(51) Int. Cl.
| A23L 33/115 | (2016.01) |
| A23L 27/00 | (2016.01) |
| A23L 33/00 | (2016.01) |
| A23L 33/18 | (2016.01) |
| A23L 33/15 | (2016.01) |
| A23L 33/16 | (2016.01) |
| A23J 3/34 | (2006.01) |
| A23J 3/30 | (2006.01) |

(52) U.S. Cl.
CPC .............. *A23L 33/115* (2016.08); *A23J 3/30* (2013.01); *A23J 3/343* (2013.01); *A23L 27/86* (2016.08); *A23L 33/15* (2016.08); *A23L 33/16* (2016.08); *A23L 33/18* (2016.08); *A23L 33/40* (2016.08); *A23V 2002/00* (2013.01)

(58) Field of Classification Search
CPC ............. A23J 3/30; A23J 3/343; A23L 33/15; A23L 33/16; A23L 33/18; A23L 33/40; A23L 33/115; A23L 27/86
USPC ........................................ 426/656, 302, 601
See application file for complete search history.

(56) References Cited

U.S. PATENT DOCUMENTS

| 4,075,195 A | 2/1978 | Roland |
| 4,282,265 A | 8/1981 | Theuer |
| 4,600,588 A | 7/1986 | Ernster |
| 4,670,268 A | 6/1987 | Mahmoud |
| 5,021,245 A | 6/1991 | Borschel et al. |
| 5,066,500 A | 11/1991 | Gil et al. |
| 5,405,637 A | 4/1995 | Martinez et al. |
| 5,422,127 A * | 6/1995 | Dube ................ A23G 3/346 426/73 |
| 5,589,357 A | 12/1996 | Martinez et al. |
| 5,664,415 A | 9/1997 | Terrier |
| 5,824,534 A | 10/1998 | Asano et al. |
| 5,837,312 A | 11/1998 | Cordle et al. |
| 6,099,871 A | 8/2000 | Martinez |
| 6,365,218 B1 | 4/2002 | Borschel et al. |
| 6,455,273 B1 | 9/2002 | Kodera et al. |
| 6,506,422 B1 | 1/2003 | Masson et al. |
| 6,863,918 B2 | 3/2005 | Bindels et al. |
| 7,070,825 B2 | 7/2006 | Ndife et al. |
| 2004/0101596 A1 | 5/2004 | Ndife et al. |
| 2005/0175759 A1 | 8/2005 | Singhai |
| 2005/0186188 A1* | 8/2005 | Guo ................ A23L 33/135 424/93.45 |
| 2006/0233915 A1 | 10/2006 | Puski et al. |
| 2006/0286252 A1 | 12/2006 | Rangavajla et al. |

FOREIGN PATENT DOCUMENTS

| CN | 1078495 | 11/1993 |
| EP | 1062873 | 12/2000 |
| JP | 10-179077 | 7/1998 |
| JP | 11-018724 | 1/1999 |
| WO | 199304593 | 3/1993 |
| WO | 199965326 | 12/1999 |
| WO | 200170047 | 9/2001 |
| WO | 2004026316 A1 | 4/2004 |
| WO | 2004054371 | 7/2004 |
| WO | 2005039319 A1 | 5/2005 |
| WO | 2006130200 | 12/2006 |

OTHER PUBLICATIONS

Ziajka, S., et al. "Characterization and properties of infant milk formulae with addition of enzymatically digested casein," Die Nahrung 30 (1986) 3-4, 413-414.

* cited by examiner

Primary Examiner — Emily M Le
Assistant Examiner — Tynesha L McClain
(74) Attorney, Agent, or Firm — Troutman Pepper Hamilton Sanders LLP; Ryan A. Schneider; Chris N. Davis

(57) ABSTRACT

The present invention relates to a method of improving tolerance to hypoallergenic infant formulas. The method comprises neutralizing the pH of infant formulas containing ingredients exhibiting fishy, sour, or beany characteristics.

8 Claims, No Drawings

METHOD OF IMPROVING TOLERANCE TO HYPOALLERGENIC INFANT FORMULAS

TECHNICAL FIELD

The present invention relates to methods of improving tolerance to hypoallergenic infant formulas.

BACKGROUND ART

Cow's milk allergy is a common food protein allergy in young children In fact, research has shown that the allergy occurs in about 2% to 3% of all infants. Sampson, H. A., Food Allergy. Part 1: Immunopathogenesis and Clinical Disorders, J Allergy Clin Immunol. 103:717-728 (1999). One proposed explanation for the prevalence of cow's milk allergy among infants is that intact cow's milk protein, which is found in most conventional infant formulas, is the earliest and most common food allergen to which infants are exposed. In fact, about 80% of currently available formulas are based upon cow's milk.

In recent years, infant formulas have been designed to reduce the incidence of protein allergies. One such example involves the use of hydrolyzed cow's milk. Typically, the proteins in hydrolyzed formulas have been treated with enzymes to break down some or most of the proteins that cause adverse symptoms with the goal of reducing allergic reactions, intolerance, and sensitization.

Another alternative for infants that have milk protein allergies is a protein-free infant formula based upon amino acids. Amino acids are the basic structural building units of protein. Breaking the proteins down to their basic chemical structure by completely pre-digesting the proteins makes amino acid-based formulas the most hypoallergenic formulas available.

Unfortunately, however, hydrolyzed and protein-free amino acid formulas are often characterized by a bitter taste that is not well tolerated by infants. Previous attempts have been made to improve the taste of hydrolyzed or protein-free formulas. For example, U.S. Pat. No. 5,589,357 to Martinez discloses that using a combination of casein and whey protein instead of the 100% whey protein that is used in some commercially available formulas may improve the taste of hydrolyzed formulas. Similarly, U.S. Pat. No. 5,837,312 to Cordle relates to a method of debittering a protein hydrolysate by applying it to a bed of siloxane and collecting the portion of the solution which does not bind to the siloxane. Each of these methods, however, requires changes in the infant formula manufacturing process which, in turn, requires expenditures in terms of both time and money. Thus, it can be seen that a need exists for a method of providing a hydrolyzed protein or amino acid-based infant formula which is less bitter tasting, is better-tolerated by infants, and is more convenient and inexpensive to implement in the manufacturing process than some other known methods.

BRIEF SUMMARY OF THE INVENTION

Briefly, an embodiment of the invention is directed to a novel method for decreasing the bitterness or improving the taste of a hydrolyzed infant formula. The method comprises intermixing a hydrolyzed protein source, a carbohydrate source, a fat source, vitamins, and minerals in a solution and then adjusting the pH of the formula to between about 6.5 and about 7.2.

The invention is also directed to a novel method for decreasing the bitterness or improving the taste of a protein-free infant formula. The method comprises intermixing a protein equivalent source, a carbohydrate source, a fat source, vitamins, and minerals in a solution and then adjusting the pH of the formula to between about 6.5 and about 7.2.

DETAILED DESCRIPTION OF THE INVENTION

Reference now will be made in detail to the embodiments of the invention, one or more examples of which are set forth below. Each example is provided by way of explanation of the invention, not a limitation of the invention. In fact, it will be apparent to those skilled in the art that various modifications and variations can be made in the present invention without departing from the scope of the invention. For instance, features illustrated or described as part of one embodiment can be used on another embodiment to yield a still further embodiment.

Thus, it is intended that the present invention covers such modifications and variations as come within the scope of the appended claims and their equivalents. Other objects, features and aspects of the present invention are disclosed in, or are obvious from, the following detailed description. It is to be understood by one of ordinary skill in the art that the present discussion is a description of exemplary embodiments only, and is not intended as limiting the broader aspects of the present invention.

As used herein, the terms "infant formula" mean a composition that satisfies the nutrient requirements of an infant by being a substitute for human milk.

As used herein, the terms "partially hydrolyzed" mean a degree of hydrolysis which is greater than 0% but less than about 50%.

The terms "extensively hydrolyzed" mean a degree of hydrolysis which is greater than or equal to about 50%.

The terms "protein-free" mean containing no measurable amount of protein, as measured by standard protein detection methods such as sodium dodecyl (lauryl) sulfate-polyacrylamide gel electrophoresis (SDS-PAGE) or size exclusion chromatography.

In an embodiment, the invention is directed to a novel method for decreasing the bitterness or improving the taste of a protein-free or hydrolyzed infant formula. The method comprises intermixing the ingredients of the formula and adjusting the pH of the formula to between about 6.5 and about 7.2. In an embodiment, the pH of the formula may be between about 6.8 and about 7.0. In another embodiment, the pH of the formula may be between about 6.5 and about 7.0. In yet another embodiment, the pH of the formula may be between about 6.8 and about 7.2.

Typical hydrolyzed or protein-free infant formulas have a pH range of about 4.5 to 6.0. In a particular embodiment of the invention, the method involves increasing the pH of the infant formula from between about 4.5 and 6.0 to between about 6.8 and 7.2. This increased pH provides the formula with a decreased bitterness, an improved taste and improved tolerability among infants, and a pH that is similar to that of breast milk.

While not wishing to be bound to this or any theory, it is believed that increasing the pH of infant formulas that are based on protein hydrolysates and amino acids causes the bitter taste of the formulas to be lessened. This provides a significant advantage over prior art methods of reducing the bitterness of hydrolyzed or protein-free formulas, in terms of both time and expense. No manufacturing processes need to be drastically altered. Instead, a simple manipulation of the final pH of the formula will provide a formula with an improved taste.

The pH of the formula may be adjusted using any means known in the art. In an embodiment, citric acid, sodium hydroxide, and/or potassium hydroxide may be used to adjust the pH of the formula.

The infant formula of the invention can be a term infant formula or a preterm infant formula. The nutritional formulation of the invention can be a liquid (ready-to-use or concentrated) or powder. In some embodiments, the nutritional formulation for use in the present invention is nutritionally complete and contains suitable types and amounts of protein, free amino acids, lipids, carbohydrates, vitamins and/or minerals.

In an embodiment, the protein source is hydrolyzed. In this embodiment, the protein source may comprise, but is not limited to, nonfat milk, soy protein, whey protein, casein protein, milk protein, or egg protein. The protein source can be partially hydrolyzed or extensively hydrolyzed. The amount of protein typically may vary from about 1 to about 5 g/100 kcal.

In a particular embodiment of the invention, the infant formula is protein-free and contains free amino acids as a protein equivalent source. In this embodiment, the amino acids may comprise, but are not limited to, histidine, isoleucine, leucine, lysine, methionine, cysteine, phenylalanine, tyrosine, threonine, tryptophan, valine, alanine, arginine, asparagine, aspartic acid, glutamic acid, glutamine, glycine, proline, serine, carnitine, taurine and mixtures thereof. In some embodiments, the amino acids may be branched chain amino acids. In other embodiments, small amino acid peptides may be included as the protein of the present invention. Such small amino acid peptides may be naturally occurring or synthesized. The amount of free amino acids in the nutritional formulation may vary from about 1 to about 5 g/100 kcal. In an embodiment, 100% of the free amino acids have a molecular weight of less than 500 Daltons. In this embodiment, the nutritional formulation may be hypoallergenic.

Another component of the infant formula of the invention is a lipid source. The amount of lipid can typically vary from about 3 to about 7 g/100 kcal. Lipid sources can be any known or used in the art, including but not limited to, vegetable oils such as palm oil, canola oil, corn oil, soybean oil, palmolein, coconut oil, medium chain triglyceride oil, high oleic sunflower oil, high oleic safflower oil, and the like.

Yet another component of the infant formula is a carbohydrate source. The amount of carbohydrate typically can vary from about 8 to about 12 g/100 kcal. Carbohydrate sources can be any known or used in the art, including but not limited to, lactose, glucose, corn syrup solids, maltodextrins, sucrose, rice syrup solids, and the like.

In certain embodiments, the infant formula may contain additional components, such as long chain polyunsaturated fatty acids (LCPUFAs). In a particular embodiment, the infant formula may contain docosahexaenoic acid (DHA) and/or arachidonic acid (ARA).

If administered as part of the present invention, the weight ratio of ARA:DHA may be from about 1:3 to about 9:1. In one embodiment of the present invention, this ratio is from about 1:2 to about 4:1. In yet another embodiment, the ratio is from about 2:3 to about 2:1. In one particular embodiment the ratio is about 2:1. In another particular embodiment of the invention, the ratio is about 1:1.5. In other embodiments, the ratio is about 1:1.3. In still other embodiments, the ratio is about 1:1.9. In a particular embodiment, the ratio is about 1.5:1. In a further embodiment, the ratio is about 1.47:1.

If administered as part of the present invention, the level of DHA may be between about 0.0% and 1.00% of fatty acids, by weight. In other embodiments, the level of DHA may be about 0.32% by weight. In some embodiments, the level of DHA may be about 0.33% by weight. In another embodiment, the level of DHA may be about 0.64% by weight. In another embodiment, the level of DHA may be about 0.67% by weight. In yet another embodiment, the level of DHA may be about 0.96% by weight. In a further embodiment, the level of DHA may be about 1.00% by weight.

If administered as part of the present invention, the amount of DHA may be from about 2 mg/100 kilocalories (kcal) to about 100 mg/100 kcal. In another embodiment, the amount of DHA may be from about 5 mg/100 kcal to about 75 mg/100 kcal. In yet another embodiment, the amount of DHA may be from about 15 mg/100 kcal to about 60 mg/100 kcal.

If administered as part of the present invention, the effective amount of DHA may be from about 3 mg per kg of body weight per day to about 150 mg per kg of body weight per day. In one embodiment of the invention, the amount is from about 6 mg per kg of body weight per day to about 100 mg per kg of body weight per day. In another embodiment the amount is from about 15 mg per kg of body weight per day to about 60 mg per kg of body weight per day.

If administered as part of the present invention, the level of ARA may be between 0.0% and 0.67% of fatty acids, by weight. In another embodiment, the level of ARA may be about 0.67% by weight. In another embodiment, the level of ARA may be about 0.5% by weight. In yet another embodiment, the level of ARA may be between about 0.47% and 0.48% by weight.

If administered as part of the present invention, the amount of ARA may be from about 4 mg/100 kilocalories (kcal) to about 100 mg/100 kcal. In another embodiment, the amount of ARA may be from about 10 mg/100 kcal to about 67 mg/100 kcal. In yet another embodiment, the amount of ARA may be from about 20 mg/100 kcal to about 50 mg/100 kcal. In a particular embodiment, the amount of ARA may be from about 25 mg/100 kcal to about 40 mg/100 kcal. In one embodiment, the amount of ARA is about 30 mg/100 kcal.

If administered as part of the present invention, the effective amount of ARA may be from about 5 mg per kg of body weight per day to about 150 mg per kg of body weight per day. In one embodiment of this invention, the amount varies from about 10 mg per kg of body weight per day to about 120 mg per kg of body weight per day. In another embodiment, the amount varies from about 15 mg per kg of body weight per day to about 90 mg per kg of body weight per day. In yet another embodiment, the amount varies from about 20 mg per kg of body weight per day to about 60 mg per kg of body weight per day.

If the infant formula of the invention is supplemented with oils containing long chain polyunsaturated fatty acids (LCPUFAs), it may be accomplished using standard techniques known in the art. For example, an equivalent amount of an oil which is normally present in a composition, such as high oleic sunflower oil, may be replaced with the LCPUFAs.

If utilized, the source of the LCPUFAs can be any source known in the art such as marine oil, fish oil, single cell oil, egg yolk lipid, brain lipid, and the like. The LCPUFAs can be in natural form or refined form.

In an embodiment, the nutritional supplement may contain at least one probiotic. The term "probiotic" means a microorganism that exerts beneficial effects on the health of the host. Any probiotic known in the art may be used, provided it is suitable for combination with the other components of the supplement. For example, the probiotic may be chosen from the group consisting of *Lactobacillus* and *Bifidobacterium*. Alternatively, the probiotic can be *Lactobacillus rhamnosus* GG (LGG).

In another embodiment, the nutritional supplement may contain at least one prebiotic. The term "prebiotic", as used herein, means a non-digestible food ingredient that stimulates the growth and/or activity of probiotics. In this embodiment, any prebiotic known in the art may be used, provided it is suitable for combination with the other components of the supplement. In a particular embodiment, the prebiotic can be selected from the group consisting of fructo-oligosaccharide (FOS), gluco-oligosaccharide, galacto-oligosaccharide, inulin, isomalto-oligosaccharide, polydextrose, xylo-oligosaccharide, and combinations thereof. In a particular embodiment, the prebiobic is a mixture of inulin and FOS.

The following examples describe various embodiments of the present invention. Other embodiments within the scope of the claims herein will be apparent to one skilled in the art from consideration of the specification or practice of the invention as disclosed herein. It is intended that the specification, together with the examples, be considered to be exemplary only, with the scope and spirit of the invention being indicated by the claims which follow the examples. In the examples, all percentages are given on a weight basis unless otherwise indicated.

Example 1

This example illustrates an embodiment of a protein-free, amino acid-based infant formula produced according to the method of the present invention. Table 1 lists the ingredients in the infant formula of Example 1.

TABLE 1

Ingredients per 100 kg formula

| Ingredient | Amount per 100 kg | Unit |
| --- | --- | --- |
| Powder Base Non-GMO | 64.992 | kg |
| Corn Syrup Solids, IP, Non-GMO | 29.026 | kg |
| Palm Olein Oil | 11.667 | kg |
| Soybean Oil | 5.185 | kg |
| Coconut Oil | 5.185 | kg |
| High Oleic Sunflower Oil | 3.889 | kg |
| Single Cell ARA and DHA Oil | 0.724 | kg |
| OSA Tapioca Starch | 4.999 | kg |
| Calcium Phosphate Dibasic | 1.6 | kg |
| Potassium Citrate | 1.333 | kg |
| Calcium Citrate | 0.396 | kg |
| Sodium Citrate Dihydrate Granular | 0.338 | kg |
| Potassium Chloride | 0.21 | kg |
| Choline Chloride | 0.175 | kg |
| Calcium Hydroxide | 0.147 | kg |
| Magnesium Oxide, Light | 0.104 | kg |
| L-Carnitine | 12.998 | g |
| Sodium Iodide | 0.11 | g |
| Corn Syrup Solids, IP, Non-GMO | 14.545 | kg |
| Essential Amino Acid Premix, Non-GMO | 9.8 | kg |
| L-Leucine | 1.736 | kg |

TABLE 1-continued

Ingredients per 100 kg formula

| Ingredient | Amount per 100 kg | Unit |
| --- | --- | --- |
| Lysine Hydrochloride | 1.408 | kg |
| L-Valine | 1.068 | kg |
| L-Isoleucine | 0.956 | kg |
| Corn Syrup Solids, IP, Non-GMO | 0.89 | kg |
| L-Threonine | 0.864 | kg |
| L-Tyrosine | 0.765 | kg |
| L-Phenylalanine | 0.708 | kg |
| L-Histidine | 0.371 | kg |
| L-Cystine | 0.371 | kg |
| L-Tryptophan | 0.337 | kg |
| L-Methionine | 0.326 | kg |
| Non-Essential Amino Acid Premix, Non-GMO | 9.8 | kg |
| L-Aspartic Acid | 2.822 | kg |
| L-Proline | 1.406 | kg |
| L-Alanine | 1.375 | kg |
| Corn Syrup Solids, IP, Non-GMO | 1.249 | kg |
| Monosodium Glutamate | 0.967 | kg |
| L-Serine | 0.865 | kg |
| L-Arginine | 0.745 | kg |
| Glycine | 0.371 | kg |
| Dry Vitamin Premix | 0.403 | kg |
| Inositol | 124.93 | g |
| Corn Syrup Solids, IP, Non-GMO | 110.869 | g |
| Ascorbic Acid | 73.346 | g |
| Taurine | 39.252 | g |
| Dry Vitamin E Acetate 50% | 24.18 | g |
| Vitamin A Palmitate, Dry Beadlets, Cold Water Dispersible | 7.657 | g |
| Niacinamide | 5.65 | g |
| Vitamin K1, Dry Phytonadione USP, 1% | 4.876 | g |
| Calcium Pantothenate | 3.546 | g |
| Vitamin D3 Powder (No BHA/BHT) | 3.143 | g |
| Biotin Trituration, 1% | 1.934 | g |
| Vitamin B12, 0.1% in Starch | 1.814 | g |
| Riboflavin | 0.645 | g |
| Thiamine Hydrochloride | 0.544 | g |
| Pyridoxine Hydrochloride | 0.496 | g |
| Folic Acid | 0.117 | g |
| Trace/Ultratrace Mineral Premix | 0.23 | kg |
| Corn Syrup Solids, IP, Non-GMO | 205.62 | g |
| Zinc Sulfate, Monohydrate | 14.145 | g |
| Selenium Trituration Non-GMO, Spray Dried | 7.475 | g |
| Cuprice Sulfate Powder (CuSO45H20) | 1.84 | g |
| Manganese Sulfate, Monohydrate | 0.92 | g |
| Iron Trituration Non-GMO, Spray Dried | | |
| Corn Syrup Solids, IP, Non-GMO | 178.238 | g |
| Ferrous Sulfate | 46 | g |
| Ascorbic Acid | 5.762 | g |

Example 2

This example illustrates an embodiment of a method used to raise the pH of an infant formula of the present invention. The powder base, corn syrup solids, essential amino acid premix, and non-essential acid premix were mixed into a solution. The pH of the solution was adjusted to about 6.8 and the solution was then pasteurized and homogenized. The solution was then evaporated to reduce the water content and dried to produce a base powder. The base powder was then dry blended with the dry vitamin premix, the trace/ultratrace mineral premix and the iron trituration. The blended powder was then packaged.

Example 3

This example illustrates the improved palatability of a pH adjusted amino acid-based product. Approximately 12 ounces of a reconstituted amino acid-based clinical product Nutramigen AA™ (Mead Johnson Nutritionals) was adjusted to a pH of 6.5. The palatability of the pH-adjusted Nutramigen AA™ product was compared to the Nutramigen AA™ product that had not been pH-adjusted, and with EleCare® (Abbott Nutritionals) and Neocate® (Nutricia) amino acid products, via a taste comparison.

The Nutramigen AA™ product that was not pH adjusted was more sour (acidic) and had a stronger fish taste, with more brothy and beany characteristics than the EleCare® and Neocate® products. The pH-adjusted Nutramigen AA™ product had less "fishy" notes, less sour notes, was less bitter, and had less beany characteristics than the non-adjusted amino acid product. The pH-adjusted Nutramigen AA™ product was more similar to EleCare® and Neocate® products in taste profile than the non-adjusted amino acid product.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties to the extent that they do not contradict anything contained herein.

The discussion of the references herein is intended merely to summarize the assertions made by their authors and no admission is made that any reference constitutes prior art. Applicants reserve the right to challenge the accuracy and pertinence of the cited references.

Although preferred embodiments of the invention have been described using specific terms, devices, and methods, such description is for illustrative purposes only. The words used are words of description rather than of limitation. It is to be understood that changes and variations may be made by those of ordinary skill in the art without departing from the spirit or the scope of the present invention, which is set forth in the following claims. In addition, it should be understood that aspects of the various embodiments may be interchanged both in whole or in part.

What is claimed is:

1. A method for decreasing the bitterness of a protein-free infant formula comprising the following steps performed in the following order:
    a) combining a source of amino acids, a carbohydrate source, and a fat or lipid source with water to produce a protein-free solution with a pH of between about 4.5 to about 6.0;
    b) increasing the pH of the protein-free solution to between about 6.5 and about 7.2 to produce an increased pH protein-free solution;
    c) reducing the water content of the increased pH protein-free solution to produce a protein-free powder;
    d) intermixing vitamins, minerals, and the protein-free powder of step c) to produce a protein-free infant formula,
wherein the protein-free infant formula is less bitter as compared to a protein-free infant formula which has not had its pH increased to between about 6.5 and about 7.2.

2. The method according to claim 1, wherein the pH of the protein-free solution is increased to between about 6.8 and about 7.0.

3. The method of claim 1, wherein the amino acids are present in the protein-free infant formula in an amount of from about 1 g/100 kcal to about 5 g/100 kcal.

4. The method of claim 1, wherein the fat or lipid source is present in the protein-free infant formula in an amount of from about 3 g/100 kcal to about 7 g/100 kcal.

5. The method of claim 1, wherein the carbohydrate source is present in the protein-free infant formula in an amount of from about 8 g/100 kcal to about 12 g/100 kcal.

6. The method of claim 1, further comprising adding at least one probiotic.

7. The method of claim 1, further comprising adding at least one prebiotic.

8. The method of claim 1, further comprising the step of pasteurizing or homogenizing the increased pH protein-free solution of step b) prior to reducing the water content in step c).

* * * * *